(12) United States Patent
Harris et al.

(10) Patent No.: US 7,285,582 B2
(45) Date of Patent: Oct. 23, 2007

(54) MODIFIED LATEX DRAG REDUCER AND PROCESSES THEREFOR AND THEREWITH

(75) Inventors: William F. Harris, Ponca City, OK (US); Kenneth W. Smith, Tonkawa, OK (US); Stuart N. Milligan, Ponca City, OK (US); Ray L. Johnston, Ponca City, OK (US); Vincent S. Anderson, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 267 days.

(21) Appl. No.: 11/026,758

(22) Filed: Dec. 30, 2004

(65) Prior Publication Data

US 2006/0148928 A1 Jul. 6, 2006

(51) Int. Cl.
*C09K 3/00* (2006.01)
(52) U.S. Cl. ...................................... 523/175
(58) Field of Classification Search ................. 523/175
See application file for complete search history.

(56) References Cited

U.S. PATENT DOCUMENTS

| | | | |
|---|---|---|---|
| 3,748,266 A | 7/1973 | Malone et al. | |
| 3,758,406 A | 9/1973 | Malone et al. | |
| 3,857,402 A | 12/1974 | Schuh | |
| 4,190,069 A | 2/1980 | Krantz | |
| 4,212,312 A | 7/1980 | Titus | |
| 4,358,572 A | 11/1982 | Mack et al. | |
| 4,983,186 A | 1/1991 | Naiman et al. | |
| 5,080,121 A | 1/1992 | Malik et al. | |
| 5,110,874 A | 5/1992 | Naiman et al. | |
| 5,244,937 A | 9/1993 | Lee et al. | |
| 5,504,132 A | 4/1996 | Smith et al. | |
| 5,539,044 A | 7/1996 | Dindi et al. | |
| 6,015,779 A | 1/2000 | Eaton et al. | |

FOREIGN PATENT DOCUMENTS

| | | |
|---|---|---|
| EP | 0555054 | 2/1997 |
| EP | 0882739 | 12/1998 |
| JP | 11-049810 | 2/1999 |

*Primary Examiner*—Edward J. Cain
(74) *Attorney, Agent, or Firm*—Lynda S. Jolly

(57) ABSTRACT

A modified latex drag reducer and methods of making and using the drag reducer in order to reduce friction losses resulting from turbulent fluid flow through a conduit. Particularly, the modified latex drag reducer is formed from an initial latex which is a product of an emulsion polymerization reaction. The initial latex is then modified, preferably by admixing with at least one low HLB surfactant or at least one solvent, or both, to form a modified latex with an enhanced dissolution rate in a hydrocarbon stream over the initial latex.

22 Claims, 6 Drawing Sheets
(1 of 6 Drawing Sheet(s) Filed in Color)

MODIFIED LATEX DRAG REDUCER AND PROCESSES THEREFOR AND THEREWITH

BACKGROUND OF THE INVENTION

1. Field of the Invention

The present invention generally relates to latex drag reducers comprising high molecular weight polymers produced according to an emulsion polymerization reaction and methods of using the same.

2. Description of the Prior Art

A drag reducer is a composition capable of substantially reducing friction loss associated with the turbulent flow of a fluid through a conduit. Where fluids are transported over long distances, such as in oil and other hydrocarbon liquid pipelines, these friction losses result in inefficiencies that increase equipment and operations costs. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. Effective drag-reducing polymers typically have molecular weights in excess of five million.

In the past, it has been proposed that drag reducers comprising polymeric latex emulsions can be used to reduce friction loss associated with turbulent fluid flow through a conduit. The use of polymeric latex emulsion drag reducers has most commonly been proposed for application to the flow of hydrocarbon streams (e.g., crude oil, gasoline, diesel fuel, etc.) through pipelines. In order to be most effective, the drag reducer must be dissolved in the hydrocarbon stream. However, in many instances, great difficulty has been encountered in dissolving the polymeric material contained in the latex emulsion into the hydrocarbon stream.

Previous proposals for solving the dissolution problem associated with polymeric latex emulsions have involved the addition of large amounts of lower aliphatic alcohols to the hydrocarbon stream prior to the addition of the latex emulsion in order to promote dissolution of the polymer. This two-step process is generally referred to as a "pre-activation" technique. Other attempts have been proposed to lessen this problem by premixing the latex emulsion with a solution of hydrocarbon and alcohol to "break" the emulsion prior to adding pre-solvated polymer to a hydrocarbon stream. These methods can prove rather costly as they require purchasing significant quantities of alcohol or other polar additives and also necessitate additional storage and mixing equipment. As a result of this and other difficulties associated with past proposals for polymeric latex emulsion drag reduces, this type of drag reducer has never been a commercially viable option to conventional drag reducers.

Current commercial methods include drag reducing polymers in bulk. These polymers must react for periods as long as 21 days in order to achieve the desired molecular weight. The reacted polymer must then be compounded with a partitioning agent, milled to less than 800 microns under cryogenic conditions, and prepared into a high solids suspension. Suspensions prepared in this manner have a tendency to separate when stored in the field locations prior to injection. Special equipment is needed to maintain the suspensions to avoid separation. This equipment typically includes provisions for agitation and protection from excessive heat.

Currently, a number of different commercial approaches are being taken to address the problem of preparing, dissolving, transporting and using such drag reducing polymers. In use, the polymers form extremely dilute solutions ranging from about 1 up to about 100 parts per million polymer and hydrocarbon, yet remain effective in order to receive drag reduction or anti-misting. A common commercial method is to prepare the polymer in dilute solutions in an inert solvent such as kerosene or other solvating material. This method utilizes a solution of high molecular weight polymer suitable for use as a drag reducing agent when produced by polymerization of alpha olefins in a hydrocarbon solvent. The entire mixture, containing polyolefin, solvent, and catalyst particles is used without separation to form dilute solutions of the polymer in crude oil or finished hydrocarbons. However, one disadvantage of such approach is the use of a solvent which poses a shipping and handling difficulty and may constitute a hazard. In addition, the product itself forms a gel-like substance which is difficult to introduce into flowing hydrocarbon streams and which becomes extremely viscous and difficult to handle under cold temperature conditions, particularly when injection into conduits at remote locations is required.

Accordingly, there exists a need for an improved, stable, single-step, latex drag reducer that can be directly added to the hydrocarbon fluid and provide satisfactory drag reduction without the need to pre-activate or pre-dissolve the polymer in a mixture of alcohol or another polar molecule.

OBJECTS AND SUMMARY OF THE INVENTION

It is, therefore, an object of the present invention to provide a latex drag reducer that can be directly added to a liquid hydrocarbon stream without needing to be pre-activated or pre-dissolved.

It is a further object of the present invention to provide a stable latex drag reducer that does not require special equipment to maintain the dispersion of the drag reducing polymer in the latex prior to injection into the working fluid.

It should be understood that the above-listed objects are only exemplary, and not all the objects listed above need be accomplished by the invention described and claimed herein.

Accordingly, one aspect of the present invention concerns a latex drag reducer comprising a continuous phase and a plurality of particles of a high molecular weight polymer dispersed in the continuous phase. The polymer particles have been formed via emulsion polymerization. The latex drag reducer has a hydrocarbon dissolution rate constant of at least about least about 0.004 min$^{-1}$ in kerosene at 20° C.

Another aspect of the present invention concerns a latex drag reducer comprising an aqueous continuous phase and a plurality of particles of a high molecular weight polymer dispersed in the continuous phase. The continuous phase comprises at least one high hydrophile-lipophile balance (HLB) surfactant, at least one low HLB surfactant, and at least one solvent. The polymer particles have been formed via emulsion polymerization.

Yet another aspect of the present invention concerns a method of making a drag reducer. The method comprises the steps of: (a) using emulsion polymerization to produce an initial latex having an initial hydrocarbon dissolution rate constant; and (b) modifying the initial latex to thereby provide a modified latex having a modified hydrocarbon dissolution rate constant. The initial and modified latexes are colloidal dispersions comprising particles of high molecular weight polymer in a continuous phase. The initial and modified hydrocarbon dissolution rate constants are measured in kerosene at 20° C. The modified hydrocarbon dissolution rate constant is at least about 10 percent greater than the initial hydrocarbon dissolution rate constant.

A further aspect of the present invention concerns a method of making a drag reducer. The method comprises the steps of: (a) combining water, at least one high HLB surfactant, and at least one monomer to thereby form a reaction mixture; (b) subjecting the reaction mixture to emulsion polymerizing at a polymerization temperature of less than about 60° C. to thereby provide an initial latex comprising particles of a drag reducing polymer having a weight average molecular weight of at least about $5 \times 10^6$ g/mol, wherein the mean particle size of the particles is less than about 1 micron; and (c) introducing at least one low HLB surfactant and at least one solvent into the initial latex in an amount sufficient enhance the hydrocarbon dissolution rate constant of the initial latex without substantially breaking or inverting the initial latex.

A still further aspect of the present invention concerns a method of reducing drag forces associated with turbulent flow of a fluid through a conduit. The method comprises introducing a drag reducer into the fluid. The drag reducer is a colloidal dispersion comprising particles of a high molecular weight polymer dispersed in a continuous phase. The polymer particles have been formed via emulsion polymerization. Prior to introduction into the fluid, the drag reducer has a hydrocarbon dissolution rate constant of at least about 0.004 $min^{-1}$ in kerosene at 20° C.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

A preferred embodiment of the present invention is described in detail below with reference to the attached drawing figures, wherein.

DETAILED DESCRIPTION OF THE PREFERRED EMBODIMENT

Figure 1:
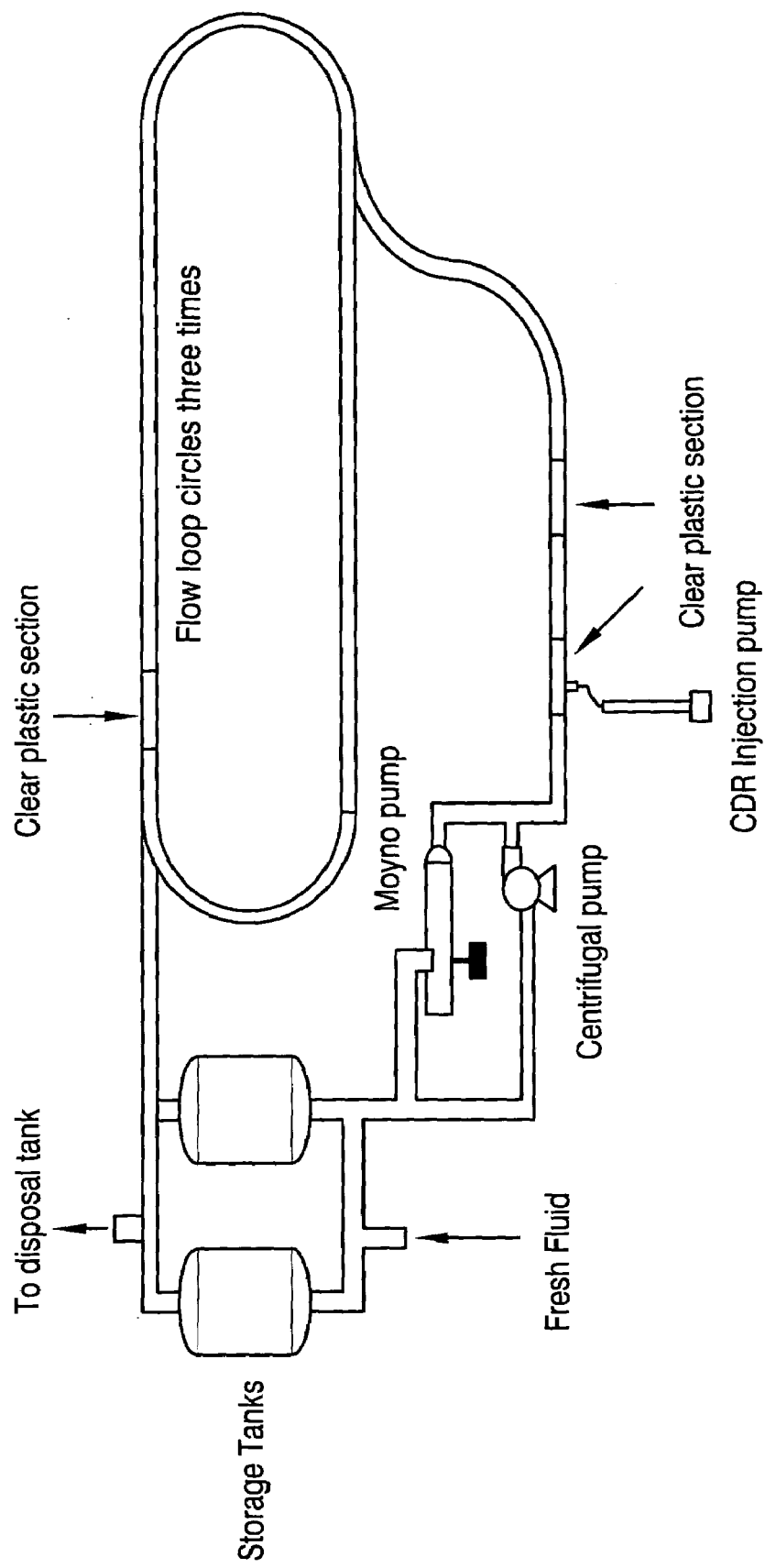
FIG. 1 is a schematic diagram of an Engineering Loop Re-circulation Test apparatus used to measure the effectiveness of drag reducers.

The first step in producing modified latex drag reducers according to the present invention is to prepare a high molecular weight polymer that can be formed into an initial latex. The polymer is prepared through an emulsion polymerization reaction of a reaction mixture comprising one or more monomers, a continuous phase, at least one surfactant, and an initiation system. The continuous phase generally comprises at least one component selected from the group consisting of water, polar organic liquids, and mixtures thereof. When water is the selected constituent of the continuous phase, the reaction mixture may also comprise at least one of a solvent and buffer.

The monomer used in formation of the high molecular weight polymer preferably includes but is not limited to one or more of the monomers selected from the group consisting of:

(A)

wherein $R_1$ is H or a C1-C10 alkyl radical, more preferably $R_1$ is H, $CH_3$, or $C_2H_5$, and $R_2$ is H or a C1-C30 alkyl radical, more preferably $R_2$ is a C4-C18 alkyl radical, and is most preferably represented by formula (i) as follows

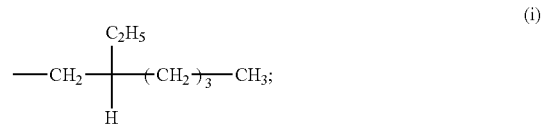

(i)

(B)

wherein $R_3$ is $CH=CH_2$ or $CH_3-C=CH_2$ and $R_4$ is H or a C1-C30 alkyl radical, more preferably $R_4$ is H or a C4-C18 alkyl radical, a phenyl ring with 0-5 substituents, a naphthyl ring with 0-7 substituents, or a pyridyl ring with 0-4 substituents;

(C)

wherein $R_5$ is H or a C1-C30 alkyl radical, and preferably $R_5$ is a C4-C18 alkyl radical;

(D)

wherein $R_6$ is H or a C1-C30 alkyl radical, preferably $R_6$ is a C4-C18 alkyl radical;

(E)

wherein $R_7$ is H or a C1-C18 alkyl radical, more preferably $R_7$ is H or a C1-C6 alkyl radical, and $R_8$ is H or a C1-C18 alkyl radical, more preferably $R_8$ is H or a C1-C6 alkyl radical, and most preferably $R_8$ is H or $CH_3$;

Maleates such as (F)

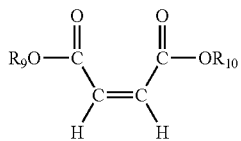

wherein $R_9$ and $R_{10}$ are independently H, C1-C30 alkyl, aryl, cycloalkyl, or heterocyclic radicals;

Fumarates such as (G)

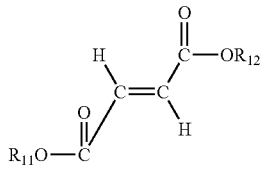

wherein $R_{11}$ and $R_{12}$ are independently H, C1-C30 alkyl, aryl, cycloalkyl, or heterocyclic radicals;

Itaconates such as (H)

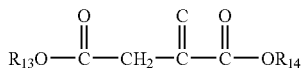

wherein $R_{13}$ and $R_{14}$ are independently H, C1-C30 alkyl, aryl, cycloalkyl, or heterocyclic radicals;

Maleimides such as (I)

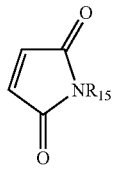

wherein $R_{15}$ is H, a C1-C30 alkyl, aryl, cycloalkyl, or heterocyclic radical.

Monomers of formula (A) are preferred, especially methacrylate monomers of formula (A), and most especially 2-ethylhexyl methacrylate monomers of formula (A).

The at least one surfactant used in the reaction mixture is preferably a high HLB anionic or nonionic surfactant. The term "HLB number" refers to the hydrophile-lipophile balance of a surfactant in an emulsion. The HLB number is determined by the method described by W. C. Griffin in *J. Soc. Cosmet. Chem.*, 1, 311 (1949) and *J. Soc. Cosmet. Chem.*, 5, 249 (1954), which is incorporated by reference herein. As used herein, "high HLB" shall denote an HLB number of 7 or more. The HLB number of surfactants for use with forming the reaction mixture is preferably at least about 8, more preferably at least about 10, and most preferably at least about 12.

Exemplary high HLB anionic surfactants include high HLB alkyl sulfates, alkyl ether sulfates, dialkyl sulfosuccinates, alkyl phosphates, alkyl aryl sulfonates, and sarcosinates. Commercial examples of high HLB anionic surfactants include sodium lauryl sulfate (available as RHODAPON™ LSB from Rhodia Incorporated, Cranbury, N.J.), dioctyl sodium sulfosuccinate (available as AEROSOL™ OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX™ 40 from Norman, Fox & Co., Vernon, Calif.), and sodium lauroylsarcosinic (available as HAMPOSYL™ L-30 from Hampshire Chemical Corp., Lexington, Mass.).

Exemplary high HLB nonionic surfactants include high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Commercial examples of high HLB nonionic surfactants include nonylphenoxy and octylphenoxy poly(ethyleneoxy) ethanols (available as the IGEPAL™ CA and CO series, respectively from Rhodia, Cranbury, N.J.), C8 to C18 ethoxylated primary alcohols (such as RHODASURF™ LA-9 from Rhodia Inc., Cranbury, N.J.), C11 to C15 secondary-alcohol ethoxylates (available as the TERGITOL™ 15-S series, including 15-S-7, 15-S-9, 15-S-12, from Dow Chemical Company, Midland, Mich.), polyoxyethylene sorbitan fatty acid esters (available as the TWEEN™ series of surfactants from Uniquema, Wilmington, Del.), polyethylene oxide (25) oleyl ether (available as SIPONIC™ Y-500-70 from Americal Alcolac Chemical Co., Baltimore, Md.), alkylaryl polyether alcohols (available as the TRITON™ X series, including X-100, X-165, X-305, and X-405, from Dow Chemical Company, Midland, Mich.).

The initiation system for use in the reaction mixture can be any suitable system for generating the free radicals necessary to facilitate emulsion polymerization. Preferred initiators include persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Preferred reducing components include, for example, bisulfites, metabisulfites, ascorbic acid, erythorbic acid, and sodium formaldehyde sulfoxylate. Preferred accelerators include any composition containing a transition metal with two oxidation states such as, for example, ferrous sulfate and ferrous ammonium sulfate. Alternatively, known thermal and radiation initiation techniques can be employed to generate the free radicals.

When water is used to form the reaction mixture, the water is preferably a purified water such as distilled or deionized water. However, the continuous phase of the emulsion can also comprise polar organic liquids or aqueous solutions of polar organic liquids, such as those solvents listed below.

As previously noted, the reaction mixture optionally includes at least one solvent and/or a buffer. Preferably, the at least one solvent is an organic solvent such as a hydrocarbon solvent (e.g., pentane, hexane, heptane, benzene, toluene, xylene), a halogenated solvent (e.g., carbon tetrachloride), a glycol (e.g., ethylene glycol, propylene glycol, glycerine), an ether (e.g., diethyl ether, diglyme, polyglycols, glycol ethers). More preferably, the solvent is a hydrocarbon solvent, and most preferably the solvent is toluene. The buffer can comprise any known buffer that is compatible with the initiation system such as, for example, carbonate, phosphate, and/or borate buffers.

In forming the reaction mixture, the monomer, water, the at least one surfactant, and optionally the at least one solvent, are combined under a substantially oxygen-free atmosphere that is maintained at less than about 1000 ppmw oxygen, more preferably less than about 100 ppmw oxygen. The oxygen-free atmosphere can be maintained by continuously purging the reaction vessel with an inert gas such as nitrogen. Preferably, the temperature of the system is kept at a level from the freezing point of the continuous phase up to about 60° C., more preferably from about 0° C. to about 45° C., and most preferably from about 0° C. to about 30° C. The system pressure is preferably kept between about 5-100 psia, more preferably between about 10-25 psia, and most preferably about atmospheric. However, higher pressures up to about 300 psia may be necessary to polymerize certain monomers, such as diolefins. Next, a buffer may be added, if required, followed by addition of the initiation system, either all at once or over time. The polymerization reaction is carried out for a sufficient amount of time to achieve at least 90% conversion by weight of the monomers. Typically, this is between about 1-10 hours, and most preferably between about 3-5 hours. All the while, the reaction mixture is continuously agitated.

The following table sets forth approximate broad and preferred amounts of the ingredients present in the reaction mixture.

| Ingredient | Broad Range | Preferred Range |
|---|---|---|
| Monomer (wt. % of entire reaction mixture) | 10-60% | 40-50% |
| Water (wt. % of entire reaction mixture) | 20-80% | 50-60% |
| Surfactant (wt. % of entire reaction mixture) | 0.1-10% | 0.25-6% |
| Initiation system | | |
| Monomer:Initiator (molar ratio) | $1 \times 10^3$:1-$5 \times 10^6$:1 | $1 \times 10^4$:1-$2 \times 10^6$:1 |
| Monomer:Reducing Comp. (molar ratio) | $1 \times 10^3$:1-$5 \times 10^6$:1 | $1 \times 10^4$:1-$2 \times 10^6$:1 |
| Accelerator:Initiator (molar ratio) | 0.01:1-10:1 | 0.01:1-1:1 |
| Solvent | 0 to twice the amount of the monomer | |
| Buffer | 0 to amount necessary to reach pH of initiation (initiator dependent, typically between about 6.5-10) | |

The emulsion polymerization reaction yields an initial latex composition. The initial latex is a stable colloidal dispersion comprising a dispersed phase and a continuous phase. The dispersed phase comprises colloidal particles of the high molecular weight polymer and solvent (if present). The colloidal particles form about 10-60% by weight of the initial latex, most preferably about 40-50% by weight. The continuous phase preferably comprises water, the at least one high HLB surfactant, solvent (if present), and buffer as needed. Water comprises from about 20-80% by weight of the initial latex, more preferably from about 40-60% by weight. Theat least one high HLB surfactant comprises from about 0.1-10% by weight of the initial latex, more preferably from about 0.25-6% by weight. As noted in the table above, the buffer is present in an amount necessary to reach the pH required for initiation of the polymerization reaction and is initiator dependent. Typically, the pH required to initiate a reaction is in the range of about 6.5-10.

The polymer of the dispersed phase preferably presents a weight average molecular weight ($M_w$) of at least about $1 \times 10^6$ g/mol, more preferably at least about $2 \times 10^6$ g/mol, and most preferably at least about $5 \times 10^6$ g/mol. The colloidal particles preferably have a mean particle size of less than about 10 microns, more preferably less than about 1000 nm (1 micron), still more preferably from about 10-500 nm, and most preferably from about 50-250 nm. At least about 95% by weight of the colloidal particles are larger than about 10 nm and smaller than about 500 nm, more preferably at least about 95% by weight of the particles are larger than about 25 nm and smaller than about 250 nm. Preferably, the polymer of the dispersed phase exhibits little or no branching or crosslinking.

The continuous phase preferably has a pH of about 4-10, most preferably from about 6-8, and contains few if any multi-valent cations.

In order for the polymer to function as a drag reducer, the polymer must dissolve or be substantially solvated in a hydrocarbon stream. The efficacy of the emulsion polymers as drag reducers when added directly to the hydrocarbon is largely dependent upon the temperature of the hydrocarbon. For example, at lower temperatures, the polymer dissolves at a lower rate in the hydrocarbon, therefore, less drag reduction is achieved. However, when the temperature of the hydrocarbon is above about 30° C., and more preferably above about 40° C., the polymer is more rapidly solvated and appreciable drag reduction is achieved. As shown in the examples below, drag reduction can be achieved at a greater range of temperature by modifying the initial latex through the addition of a low HLB surfactant and/or a solvent. The resulting modified latex can be provided as a "one package" system wherein the drag reduction properties of the polymer are available to the hydrocarbon stream in a much faster time period.

In addition to increasing the hydrocarbon dissolution rate of the polymer, modification of the latex serves to provide a stable colloidal dispersion that will not flocculate or agglomerate over time and to ensure that the latex will not become fully broken or inverted. The modified latex is formed by adding at least one low HLB surfactant and/or at least one solvent to the initial latex. It is preferable to modify the initial latex with both a low HLB surfactant and a solvent. As used herein, "low HLB" shall denote an HLB number less than 7. Preferably, the low HLB surfactant has an HLB number of less than about 6, still more preferably less than about 5, and most preferably between about 1-4.

Exemplary suitable low HLB surfactants include low HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, polyethylene glycols, linear alcohol ethoxylates, alkyl phenol ethoxylates, and oil soluble polymeric emulsifiers such as polyisobutylene succinic anhydride copolymer diethanol amine salt/amide or salt/amide mixtures, and Hypermer B-206.

Commercial examples of suitable nonanionic low HLB surfactants include sorbitan trioleate (available as SPAN™ 85 from Uniqema, Wilmington, Del.), sorbitan tristearate (available as SPAN™ 65 from Uniqema, Wilmington, Del.), sorbitan sesquioleate (available as LUMISORB™ SSO from Lambent Technologies, Skokie, Ill.), sorbitan monooleate (available as ALKAMULS™ SMO from Rhodia Inc., Cranbury, N.J.), sorbitan monostearate (available as SPAN™ 60 from Uniqema, Wilmington, Del.), ethylene glycol fatty acid ester (available as MONOSTRIOL™ EN-C from Undesa, Barcelona, Spain), polyethylene glycol dioleate (such as ALKAMULS™ 600 DO from Rhodia Inc., Cranbury, N.J.) propylene glycol monostearate (available as MONOSTRIOL™ PR-A from Undesa, Barcelona, Spain), glycerol monostearate (available as KEMFLUID™ 203-4 from Undesa, Barcelona, Spain), polyisobutylene succinic anhydride copolymer diethanol amine salt (available as LUBRIZOL™ 2700, from The Lubrizol Corporation, Wickliffe, Ohio), and proprietary hydrophobic polymeric surfactants (such as HYPERMER™ B-206 from Uniqema, Wilmington, Del.).

The amount of low HLB surfactant required to modify the initial latex depends on the desired dissolution rate for the polymer as well as the amount of solvent used. This provides the flexibility needed to adjust the dissolution rate to pipeline conditions. Preferably, the finished formulation (i.e., the modified latex drag reducer) contains from about 1-95% by weight of the low HLB surfactant, more preferably from about 1-50% by weight, even more preferably from about 1-30% by weight, and most preferably from about 1-25% by weight.

Suitable solvents for use in forming the modified latex drag reducer include aromatic solvents (such as benzene, toluene, xylene, ethylbenzene, dibenzyl toluene, benzyltoluene, butylxylene, diphenylethane, diisopropylbiphenyl, triisopropylbiphenyl, etc.), partially or fully hydrogenated aromatic solvents (such as tetrahydronaphthalene or decahydronaphthalene), glycols (such as ethylene glycol, propylene glycol, butylenes glycol, hexylene glycol, polyglycols such as diethylene glycol, triethylene glycol, polyethylene glycol, polypropylene glycol and ethylene oxide propylene oxide block copolymers, glycol ethers, polypropylene glycol butyl ether, ethylene glycol butyl ether, propylene glycol methyl ether, propylene glycol butyl ether, propylene glycol phenyl ether, diethylene glycol methyl ether, dipropylene glycol methyl ether, triethylene glycol methyl ether), esters (such as butyl formate, ethyl acetate, lactate esters), nitrogen containing solvents (such as dimethylformamide), aliphatic and aromatic alcohols (such as methanol, ethanol, isopropanol, hexyl alcohol, 2-ethylhexyl alcohol, benzyl alcohol, tetrahydrofurfuryl alcohol), ketones (such as acetone, methyl ethyl ketone, methyl isobutyl ketone, methyl isoamyl ketone, cyclohexanone), sulfur containing solvents (such as dimethyl sulfoxide), tetrahydrofuran, alkyl halides (such as methylene chloride, 1,1,1-trichloroethane, perchloroethylene), and combinations thereof. Most preferred are low molecular weight glycols having a molecular weight of less than about 1000, more preferably having a molecular weight between about 100-600, and most preferably between about 200-500. Polyethylene glycol having a molecular weight of about 200 can also be used.

The amount of solvent required depends on the desired dissolution rate for the polymer. The minimum amount of solvent is that which is necessary to provide the minimum desired dissolution rate in the pipeline in order to maximize the amount of active drag reducing polymer. Preferably, the modified latex drag reducer contains from about 1-95% by weight of the solvent, more preferably from about 1-50% by weight, even more preferably from about 10-30% by weight, and most preferably from about 15-25% by weight.

Modification of the initial latex emulsion is accomplished through a simple mixing operation. Mixing may be accomplished using a simple overhead mixer, or the materials may be metered and proportionately fed into a continuous or static mixer depending on the viscosity of the materials selected for the modification. The order of addition of the modification materials has been observed to have an effect on the ease of preparation in the case of materials that have a high viscosity. In this situation, it is generally easiest to add the solvent first followed by the surfactant and lastly the emulsion. However, in most cases, the order of addition does not appear to have an impact on the properties of the finished mixture. Mixing preferably occurs at a temperature between about 5-60° C., more preferably between about 15-30° C. under about atmospheric pressure. If a high viscosity surfactant is used, a dispersion mixer may be employed such as those used to prepare pigment dispersions. The time of mixing depends largely on the viscosity of the materials being used. Low viscosity mixtures may be prepared within minutes, however, mixtures of high viscosity surfactants may require extended mixing periods.

The molecular weight of the polymer from the initial latex is substantially unaffected by the addition of the modifying low HLB surfactant and solvent. The particle size of the colloidal particles are generally the same as in the initial latex, however, it is possible that some swelling of the particles may occur depending on the type of solvent used in the modification step. Because of this swelling, the particle size distribution may also be affected. The viscosity of the latex drag reducer may be increased by the addition of the surfactant and solvent. The maximum concentration of surfactant and solvent should be selected so that the modified latex composition remains relatively easy to pump.

The modified latex can be employed as a drag reducer in almost any liquid having a hydrocarbon continuous phase. For example, the modified latex may be used in pipelines carrying crude oil or various refined products such as gasoline, diesel fuel, fuel oil and naphtha. The drag reducer is ideally suited for use in pipelines and conduits carrying fluid in turbulent flow conditions and may be injected into the pipeline or conduit using conventional or umbilical delivery systems. The amount of drag reducer injected is expressed in terms of concentration of polymer in the hydrocarbon-containing fluid. Preferably, the concentration of the polymer in the hydrocarbon-containing fluid is from about 0.1-100 ppmw, more preferably from about 0.5-50 ppmw, even more preferably from about 1-20 ppmw, and most preferably 1-5 ppmw.

The solubility of the modified and initial latexes in a hydrocarbon-containing liquid are described herein in terms of a hydrocarbon dissolution rate constant "k." The hydrocarbon dissolution rate constant (k) is determined in the manner described in Example 2, below. The modified latex, described above, has a hydrocarbon dissolution rate constant $(k_m)$ that is greater than the hydrocarbon dissolution rate constant of the initial (i.e., unmodified) latex $(k_i)$. Preferably, the hydrocarbon dissolution rate constant of the modified latex $(k_m)$ in kerosene at 20, 40, and/or 60° C. is at least about 10% greater than the hydrocarbon dissolution rate constant of the initial latex $(k_i)$ in kerosene at 20, 40, and/or 60° C., respectively, more preferably at least about 25% greater, still more preferably at least about 50% greater, even more preferably at least about 100% greater, and most preferably at least about 500% greater. The hydrocarbon dissolution rate constant of the modified latex $(k_m)$ in kerosene at 20° C. is preferably at least about 0.004 $min^{-1}$, more preferably at least about 0.008 $min^{-1}$, and most preferably at least 0.012 min$^{-1}$. The hydrocarbon dissolution rate constant of the modified latex ($k_m$) in kerosene at 40° C. is preferably at least about 0.01 min$^{-1}$, more preferably at least about 0.02 min$^{-1}$, and most preferably at least 0.04 min$^{-1}$. The hydrocarbon dissolution rate constant of the modified latex ($k_m$) in kerosene at 60° C. is preferably at least about 0.05 min$^{-1}$, more preferably at least about 0.2 min$^{-1}$, and most preferably at least 0.4 min$^{-1}$. The hydrocarbon dissolution rate constant of the initial latex ($k_i$) in kerosene at 20° C. is typically less than about 0.004 min$^{-1}$, or even less than about 0.002 min$^{-1}$, or even less than 0.001 min$^{-1}$. The hydrocarbon dissolution rate constant of the initial latex ($k_i$) in kerosene at 40° C. is typically less than about 0.01 min$^{-1}$, or even less than about 0.008 min$^{-1}$, or even less than 0.006 min$^{-1}$. The hydrocarbon dissolution rate constant of the initial latex ($k_i$) in kerosene at 60° C. is typically less than about, or even less than about 0.004 min$^{-1}$, or even less than 0.003 min$^{-1}$.

It is preferred for modified latex drag reducers of the present invention of be relatively stable so that they can be stored for long periods of time and thereafter employed as effective drag reducers without further modification. As used herein, "shelf stability" shall denote the ability of a colloidal dispersion to be stored for significant periods of time without a significant amount of the dispersed solid phase dissolving in the liquid continuous phase. It is preferred for the modified drag reducer to exhibit a shelf stability such that less than about 25 weight percent of the solid particles of high molecular weight polymer dissolves in the continuous phase over a 6-month storage period, where the modified drag reducer is stored without agitation at standard temperature and pressure (STP) during the 6-month storage period. More preferably, the modified drag reducer exhibits a shelf stability such that less than about 10 weight percent of the solid particles of high molecular weight polymer dissolves in the continuous phase over the 6-month storage period. Most preferably, the modified drag reducer exhibits a shelf stability such that less than 5 weight percent of the solid particles of high molecular weight polymer dissolves in the continuous phase over the 6-month storage period.

As used herein, "dissolution rate stability" shall denote the ability of a drag reducer to be stored for significant periods of time without significantly altering the hydrocarbon dissolution rate constant of the drag reducer. It is preferred for the modified latex drag reducer to exhibit a dissolution rate stability such that the hydrocarbon dissolution rate constant of the modified latex drag reducer at the end of a 6-month storage period, defined above, is within about 25 percent of the hydrocarbon dissolution rate constant of the modified latex drag reducer at the beginning of the 6-month storage period. More preferably, the modified latex drag reducer exhibits a dissolution rate stability such that the hydrocarbon dissolution rate constant of the modified latex drag reducer at the end of the 6-month storage period is within about 10 percent of the hydrocarbon dissolution rate constant of the modified latex drag reducer at the beginning of the 6-month storage period. Most preferably, the modified latex drag reducer exhibits a dissolution rate stability such that the hydrocarbon dissolution rate constant of the modified latex drag reducer at the end of the 6-month storage period is within 5 percent of the hydrocarbon dissolution rate constant of the modified latex drag reducer at the beginning of the 6-month storage period.

Drag reducers made in accordance with the present invention preferably provide significant percent drag reduction (% DR) when injected into a pipeline. Percent drag reduction (% DR) and the manner in which it is calculated are more fully described in Example 2, below. Preferably, modified drag reducers according to the present invention provide at least about a 2% drag reduction, more preferably at least about 5% drag reduction, and most preferably at least 8% drag reduction.

EXAMPLES

Example 1

Emulsion Polymerization of 2-Ethylhexyl Methacrylate Using Redox Initiation

In this example, an initial latex according to the present invention was prepared. Generally, 2-ethylhexyl methacrylate was polymerized in an emulsion comprising water, surfactant, initiator, and a buffer.

More specifically, the polymerization was performed in a 300 mL jacketed reaction kettle with a condenser, mechanical stirrer, thermocouple, septum ports, and nitrogen inlets/outlets. The kettle was charged with 0.231 g of disodium hydrogenphosphate, 0.230 g of potassium dihydrogenphosphate, and 4.473 g of sodium dodecyl sulfonate. The kettle was purged with nitrogen overnight. Next, the kettle was charged with 125 g of deoxygenated HPLC-grade water, the kettle contents were stirred at 300 rpm, and the kettle temperature set to 5° C. using the circulating bath. The 2-ethylhexyl methacrylate monomer (100 mL, 88.5 g) was then purified to remove any polymerization inhibitor present, deoxygenated (by bubbling nitrogen gas through the solution), and transferred to the kettle.

In this example, four initiators were prepared for addition to the kettle: an ammonium persulfate (APS) solution by dissolving 0.131 g of APS in 50.0 mL of water; a sodium formaldehyde sulfoxylate (SFS) solution by dissolving 0.175 g of SFS in 100.0 mL of water; a ferrous sulfate solution by dissolving 0.021 g of $FeSO_4 \cdot 7H_2O$ in 10.0 mL water; and a tert-butyl hydroperoxide (TBHP) solution by dissolving 0.076 g of 70% TBHP in 50.0 mL of water.

The kettle was then charged with 1.0 mL of ferrous sulfate solution and over a two-hour period, 1.0 mL of APS solution and 1.0 mL of SFS solution were added concurrently. Following APS and SFS addition, 1.0 mL of TBHP solution and 1.0 mL of SFS solution were added concurrently over a two-hour period.

The final latex was collected after the temperature cooled back to the starting temperature. The final latex (216.58 g) comprised 38.3% polymer and a small amount of coagulum (0.41 g).

Example 2

In this example, the drag reduction capabilities of the 38% poly-2-ethylhexyl methacrylate polymer emulsion prepared in Example 1 were evaluated in a #2 diesel fuel system. The test device used in this example was a two inch Engineering Loop Re-circulation Test apparatus as shown in FIG. 1. This test allowed for the evaluation of drag reducer performance when injected in non-predissolved form into a hydrocarbon fluid in the flow loop. The test was used to simulate performance profiles and drag reducer behavior in field pipelines over a three-hour time period in terms of dissolution, peak performance, and degradation of the drag-reducing polymer.

In the two inch pipe-loop recirculation test, 600 gallons of diesel at 70° F. was recirculated from a mixed reservoir through a 2-inch diameter pipe loop and back to the reservoir. Approximate holdup in the pipe is 100 gallons. The diesel was recirculated at 42.3 gpm using a low-shear progressing cavity pump. Pressure drop was measured over a 440-ft section of the pipe loop. "Base" case pressure drop was measured during a period of non-injection. "Treated" case pressure drop was measured during and following injection of the drag reducer sample. In the two inch pipe-loop recirculation test, sample material was injected for a 2-minute period into the pipe just downstream of the reservoir and pump, with the volume of material injected being equal to that required to obtain the target ppm for the full 600 gallon reservoir. Monitoring of pressure drop continued for a 3-hour period following injection. In this particular example, sufficient drag reducer polymer emulsion was injected into the test loop to yield a 5 ppm concentration of poly-2-ethylhexylmethacrylate (w/w) based on the #2 diesel fuel. No measurable drop in pressure was recorded in 3 hours of recirculation. This was equal to 0% drag reduction (% DR).

Percent drag reduction is the ratio of the difference between the baseline pressure drop ($\Delta P_{base}$) and the treated pressure drop ($\Delta P_{treated}$) to the baseline pressure drop ($\Delta P_{base}$) at a constant flow rate:

$$\% \, DR = (\Delta P_{base} - \Delta P_{treated})/\Delta P_{base}$$

The rate at which the polymer dissolves into the hydrocarbon stream is a very important property. The most effective drag reduction cannot occur until the polymer is dissolved or substantially solvated in the conduit. The rate at which the polymer dissolves can be determined by a vortex inhibition test in kerosene at various temperatures. At a constant stirring speed, the depth of the vortex is proportional to the amount of dissolved polymer in the kerosene. The dissolution rate is a first order function:

$$d/dt \, (Conc_{undissolved}) = -k \times Conc_{undissolved}$$

wherein k is the dissolution rate constant. The time, T, for a certain fraction of the polymer to be dissolved is a function of k as follows:

$$T_{\% \, dissolved} = [ln \, 100/(100 - \% \, dissolved)]/k$$

Figures 2, 3:
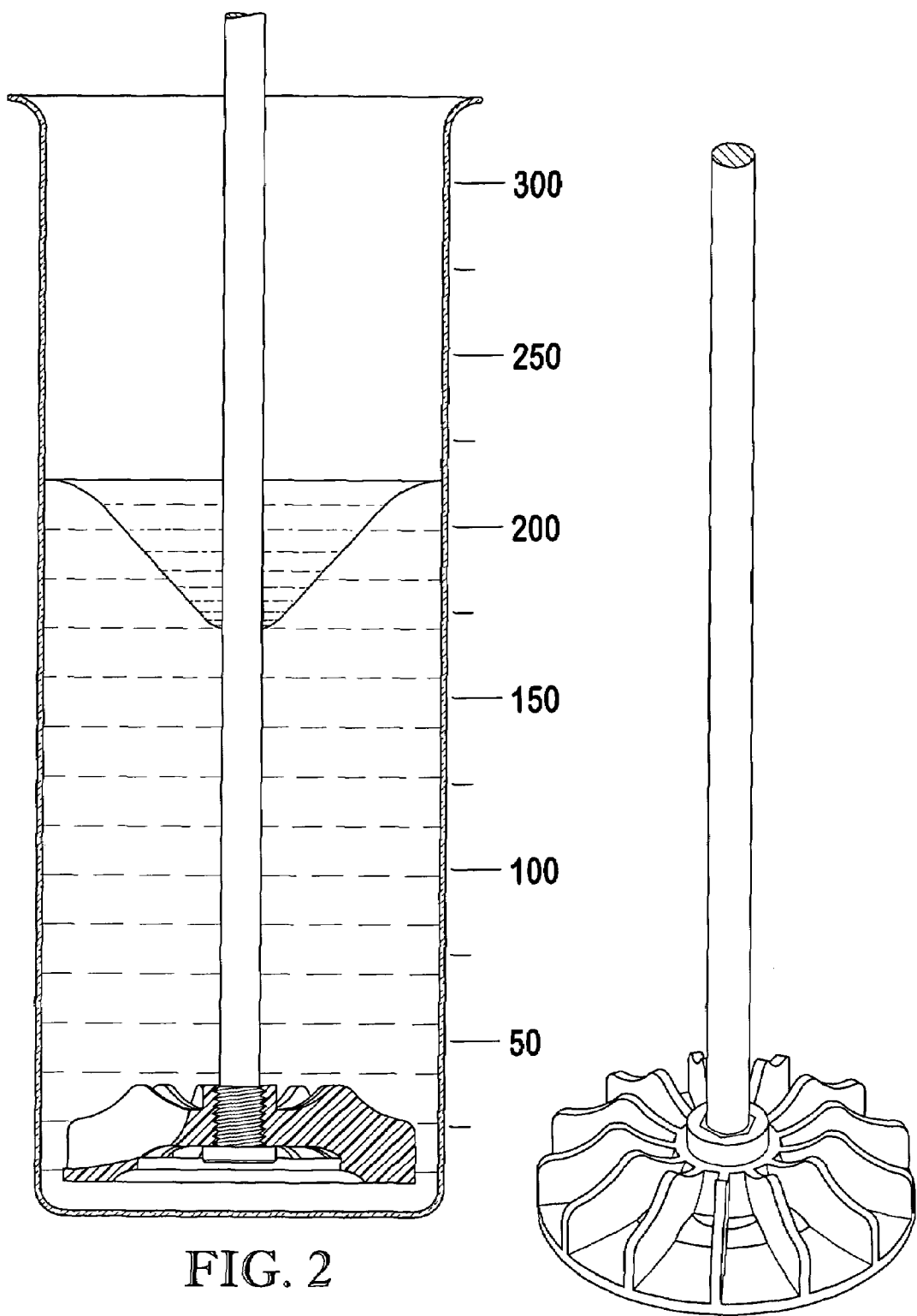
FIG. 2 is a schematic illustration of a test apparatus used to perform dissolution rate tests on various drag reducers.
FIG. 3 is an isometric view of the stirrer employed in the dissolution rate tests.
Figure 4:
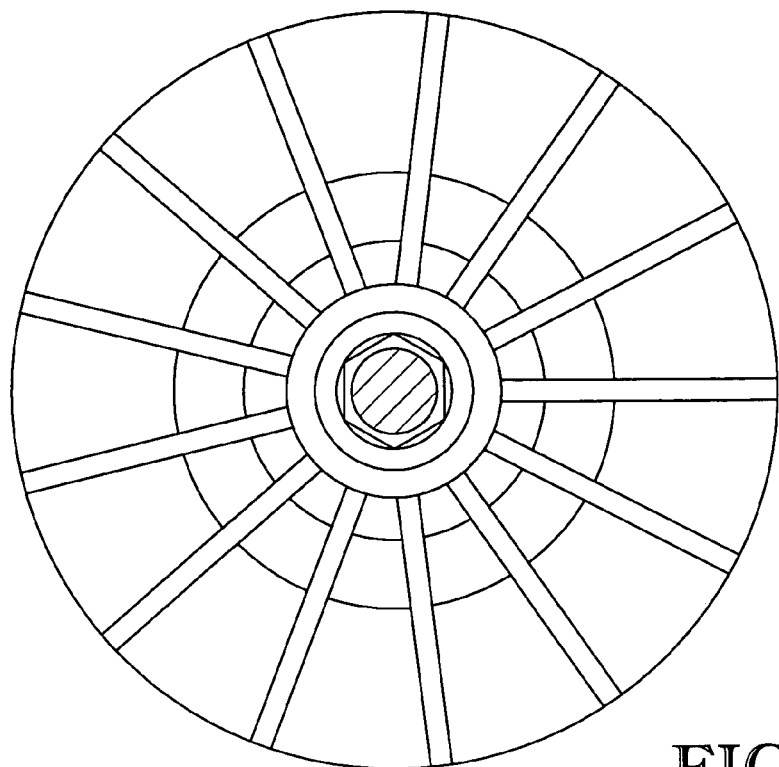
FIG. 4 is a top view of the stirrer employed in the dissolution rate tests.
Figure 5:
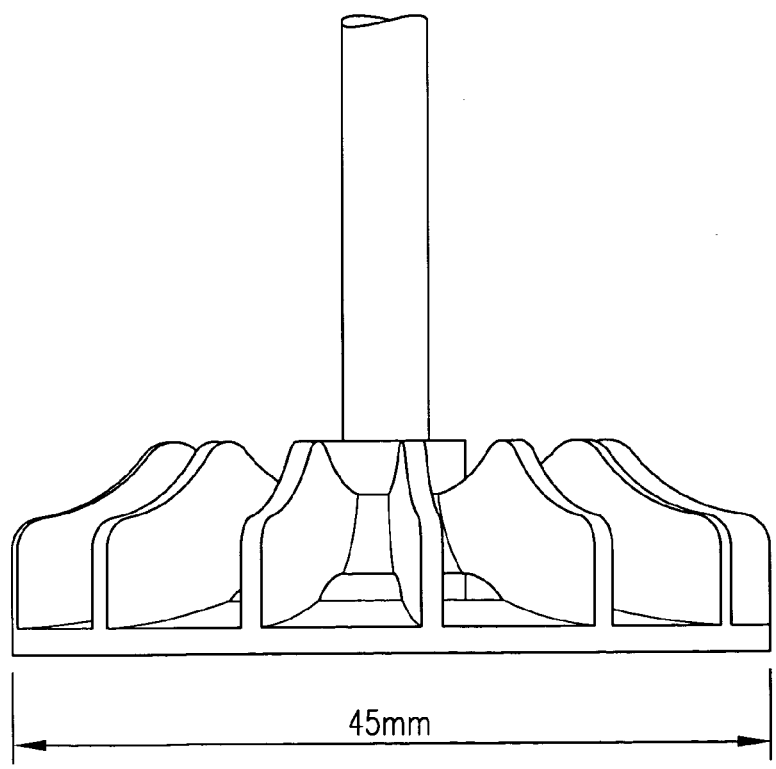
FIG. 5 is a side view of the stirrer employed in the dissolution rate tests.

FIG. 2 schematically illustrates the dissolution rate test apparatus used to determine the dissolution rate constant. The dissolution rate test apparatus included a rotating stirrer that was placed in a jacketed graduated 250 mL cylinder having an internal diameter of 48 mm. The upper end of the rotating stirrer was connected to a variable-speed motor (not shown). The specific configuration of the rotating stirrer is illustrate in detail in FIGS. 3-5. The rotating stirrer employed in the dissolution rate tests was a Black & Decker paint stirrer made from a casting of oil resistant plastic. The stirrer head was formed of a 45 mm diameter disk made up of a central disk and an outer ring. The central disk was 20 mm in diameter and 1.5 mm thick and was centered on a hub that was 12 mm in diameter and 12 mm thick. The hub was drilled in the center for attachment of the stirring head to a 4 mm diameter shaft. The shaft was threaded for 27 mm so that two small nuts held the stirring head to the shaft. The outer ring was 45 mm in diameter, 9 mm wide, and 1.5 mm thick. The outer ring was attached to the inner disk by 13 evenly spaced arcs 13 mm long and 1 mm thick. The outer disk resided 6 mm below the level of the inner disk. The arcs that attached the outer ring to the inner disk acted as paddles to stir the fluid in the test cylinder. The shaft that attached the stirring head to the stirring motor (not shown) was 300 mm long. It should be noted that dissolution rate test results may vary somewhat if different stirrer configurations are used.

To conduct the dissolution rate test, the stirrer was positioned inside the cylinder and adjusted so that the bottom of stirrer head was about 5 millimeters from the bottom of the cylinder. The cylinder jacket was then filled with water recirculated from a recirculating water bath with controlled heating and cooling capability. The desired temperature was selected and the bath was allowed to reach that temperature. The jacketed graduated cylinder was filled with kerosene to the 200 mL line with the stirrer in place. The circulation of cooling fluid through the graduated cylinder jacket was initiated. The kerosene inside the graduated cylinder was stirred for sufficient time to allow the temperature to equilibrate at the set temperature, usually 10-15 minutes. The kerosene temperature was checked with a thermometer to insure that the kerosene was at the desired test temperature. The speed of the motor was adjusted to stir rapidly enough to form a vortex in the kerosene that reached to the 125 mL graduation in the cylinder.

An aliquot of pre-dissolved polymer containing the desired concentration of polymer was added to the kerosene while the vortex was formed. The pre-dissolved polymer was prepared by mixing the latex emulsion with a solvent having suitable solubility parameters to achieve full dissolution. The container with the emulsion and solvent was rolled overnight. In the case of an emulsion of poly-2-ethylhexylmethacrylate, a mixture of 20% isopropanol and 80% kerosene (v/v) allowed full dissolution of the polymer at room temperature within this time period. For example, a 3% solution of poly-2-ethylhexylmethacrylate was prepared by adding 7.83 grams of a 38.3% polymer emulsion into 92.17 grams of 20% isopropanol and 80% kerosene (v/v) and followed by shaking to disperse the emulsion in an 8 ounce jar. The solvent system rapidly became viscous. The jar was then placed onto a roller rotating at a slow speed and allowed to homogenize overnight.

Aliquots of the pre-dissolved polymer were added quickly (i.e., within about 5 seconds) to the stirred kerosene in the graduated cylinder to determine the amount of polymer required to achieve full vortex closure, defined as closure at the 175 ml mark in the graduated cylinder. In the case of the 38.3% poly-2-ethylhexylmethacrylate emulsion prepared in Example 1, it was determined that 200 ppm active polymer was needed to completely close the vortex.

Emulsions which had not been pre-dissolved had their dissolution rates measured using the same polymer concentration required for full vortex closure for the pre-dissolved polymer by the following procedure. An aliquot of the emulsion, either modified or unmodified, was added to the kerosene at the desired concentration and temperature. A timer was used to monitor and record the time that the vortex reached the 130, 135, 140, 145, 150, 155, 160, 165, 170, and 175 mL marks on the cylinder. However, the determination was stopped when the time exceeded 30 minutes.

The dissolution constant, k, was calculated by first determining the relative vortex, Rv, and then plotting the time required to reach the various vortex marks vs. the log of the relative vortex. The relative vortex is the decimal fraction of the full vortex at 125 mL. The full vortex is the difference between 200 mL (the volume in the graduated cylinder) and the vortex at 125 mL (i.e., 75 mL).

$$Rv = (200 - \text{actual vortex})/\text{full vortex}$$

For example, when the actual vortex is 130 ml, the relative vortex is 0.833. The time required to reach the various vortex marks was plotted versus the log of the relative vortex. A data trendline was then developed and a regression was performed on the trendline. The slope of the trendline was multiplied by −2.303 to convert the data back to linear values. This was the dissolution rate constant, k, for a given temperature and concentration of active polymer.

The dissolution rate of the 38.3% poly-2-ethylhexyl-methacrylate emulsion prepared in Example 1 was measured using the dissolution rate test at 500 ppm active polymer. Results show that the emulsion polymer had virtually no dissolution at 20° C. and 30° C. and very low dissolution rates at temperatures up to 60° C.

| Temperature, ° C. | Dissolution Rate Constant, k (min$^{-1}$) |
|---|---|
| 20 | <0.001 |
| 30 | <0.001 |
| 40 | 0.005 |
| 50 | 0.009 |
| 60 | 0.022 |

In Examples 3-5, various solvents and surfactants were incorporated into the latex emulsion prepared in Example 1 in order to determine the effect thereof on the dissolution rate of the emulsion polymer in a hydrocarbon.

Example 3

Toluene (104.15 g) was added to a 600 ml beaker and the beaker placed under an overhead stirrer equipped with a 2 inch diameter 3-blade propeller. The stirrer was adjusted to 250 rpm and 41.675 grams of sorbitan sesquioleate (available as Lumisorb SSO from Lambent Technologies, Skokie, Ill.) was added and mixed for 10 minutes until it dissolved. A portion of the emulsion prepared in Example 1 (104.175 g) was then added and the system mixed for 20 minutes. The composition had a density of 0.939 g/ml and a Brookfield LVDVII+ viscosity of 3700 mPa·s using a # 4 spindle at 12 rpm. The composition in terms of percent by weight was as follows:

| | |
|---|---|
| Emulsion from Example 1 | 41.67% |
| Toluene | 41.66% |
| Sorbitan sesquioleate | 16.67% |

The dissolution rate of this material was measured using the dissolution rate test described above. The results show that the modified emulsion polymer had good dissolution properties which improve with increasing temperature.

| Temperature, ° C. | Dissolution Rate Constant, k (min$^{-1}$) |
|---|---|
| 20 | 0.015 |
| 30 | 0.023 |
| 40 | 0.047 |
| 50 | 0.072 |
| 60 | 0.60 |

Example 4

Toluene (104.15 g) was added to a 600 ml beaker and the beaker placed under an overhead stirrer equipped with a 2 inch diameter 3-blade propeller. The stirrer was adjusted to 250 rpm. A quantity of the emulsion prepared in Example 1 (145.85 g) was then added and the system mixed for 20 minutes. The composition had a density of 0.937 g/ml. The Brookfield LVDVII+ viscosity was too high to be measured using this instrument at 12 rpm. The composition in terms of percent by weight was as follows:

| | |
|---|---|
| Emulsion from Example 1 | 58.34% |
| Toluene | 41.66% |
| Sorbitan sesquioleate | 0% |

The dissolution rate this material was measured using the dissolution rate test described above. Results show that the emulsion polymer had no dissolution at 20° C. and 30° C. and very low dissolution rates at temperatures up to 60° C.

| Temperature, ° C. | Dissolution Rate Constant, k (min$^{-1}$) |
|---|---|
| 20 | <0.001 |
| 30 | 0.007 |
| 40 | 0.016 |
| 50 | 0.029 |
| 60 | 0.037 |

Example 5

A quantity of the emulsion prepared in Example 1 (208.325 g) was added to a 600 ml beaker and the beaker placed under an overhead stirrer equipped with a 2 inch diameter 3-blade propeller. The stirrer was adjusted to 250 rpm and 41.675 g of sorbitan sesquioleate was then added and the system mixed for 20 minutes. The composition had a density of 0.991 g/ml and the Brookfield LVDVII+ viscosity was too high to be measured using this instrument at 12 rpm. The mixture had a smooth, paste-like consistency. The composition in terms of percent by weight is as follows:

| | |
|---|---|
| Emulsion from Example 1 | 83.33% |
| Toluene | 0% |
| Sorbitan sesquioleate | 16.67% |

The dissolution rate this material was measured using the dissolution rate test described above. Results show that the emulsion polymer had no dissolution at 20° C. and 30° C. and very low dissolution rates at temperatures up to 60° C.

| Temperature, ° C. | Dissolution Rate Constant, k (min$^{-1}$) |
|---|---|
| 20 | <0.001 |
| 30 | <0.001 |
| 40 | <0.001 |
| 50 | 0.002 |
| 60 | 0.010 |

Figure 6:
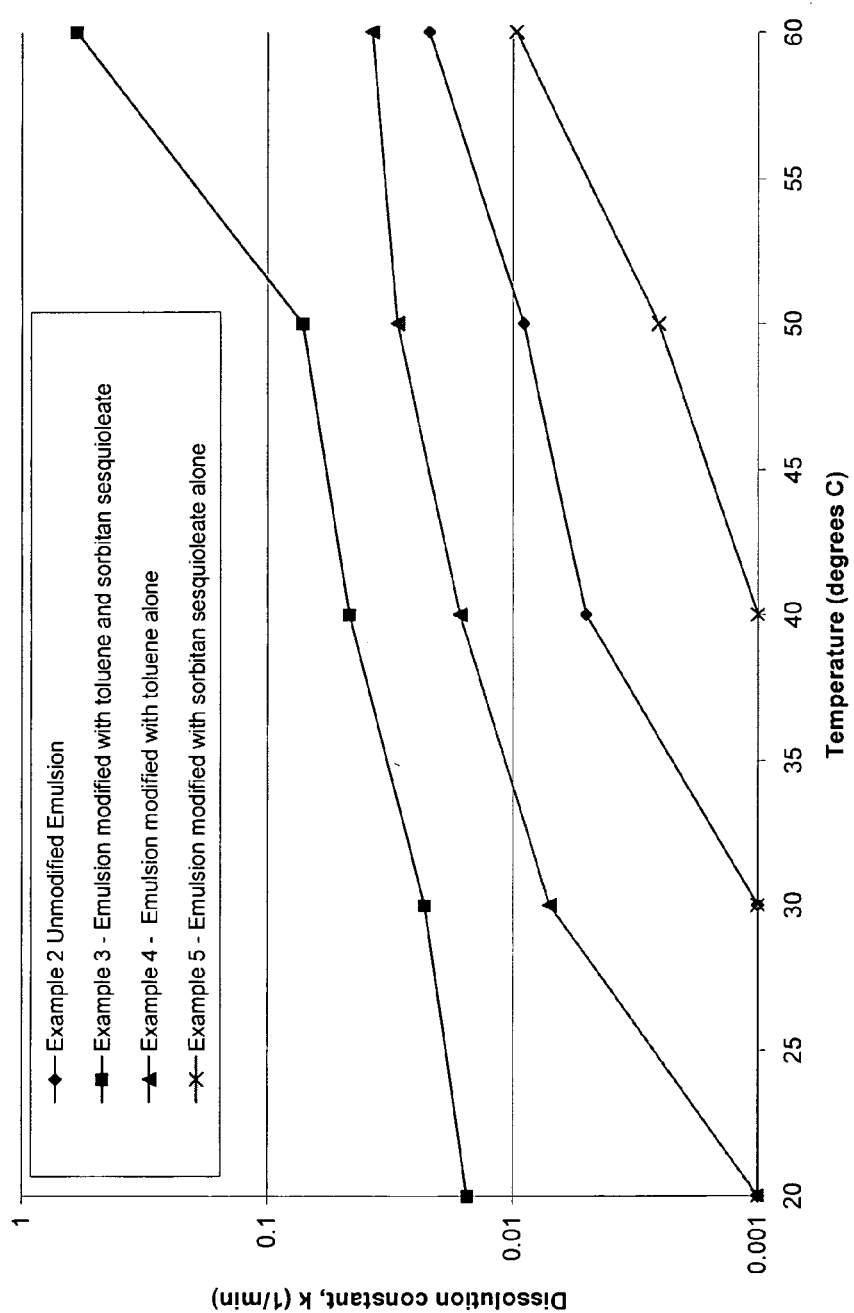
FIG. 6 is a graph showing the effect that modification of the initial latex has on the hydrocarbon dissolution rate constant of the drag reducer over a range of temperatures.

The three examples above (Examples 3, 4 and 5) illustrate the dramatic improvement in dissolution rate realized by using both a surfactant and a solvent to modify the dissolution properties of the subject emulsion polymers in hydrocarbons. Much faster dissolution can be obtained by using both a surfactant and a solvent than can be obtained by the use of either class of additive singly. A plot of the dissolution rate factor, k, vs. the temperature of the hydrocarbon used (kerosene) is presented in FIG. 6.

Example 6

In this example, 75 g of acetone was added to a 600 mL beaker and the beaker placed under an overhead stirrer equipped with a 2 inch diameter 3-blade propeller. The stirrer was adjusted to 250 rpm and 50 g of sorbitan sesquioleate was added and mixed for 10 minutes until it dissolved. A quantity of the emulsion prepared in Example 1 (125 g) was then added and the system mixed for 20 minutes. The composition had a density of 0.94 g/mL and a Brookfield LVDVII+ viscosity of 6700 mPa·s using a # 4 spindle at 12 rpm. The composition in terms of percent by weight was as follows:

| | |
|---|---|
| Emulsion from Example 1 | 50% |
| Acetone | 30% |
| Sorbitan sesquioleate | 20% |

The dissolution rate this material was measured using the dissolution rate test described above. Results show that the modified emulsion polymer had good dissolution properties which improve with increasing temperature.

| Temperature, ° C. | Dissolution Rate Constant, k (min$^{-1}$) |
|---|---|
| 20 | 0.117 |
| 30 | 0.078 |
| 40 | 0.101 |
| 50 | 0.094 |
| 60 | 0.309 |

This example illustrates how an alternate solvent can be used to achieve faster dissolution properties at a lower temperature. This can be important in many pipeline applications where the crude oil or refined products are transported at lower temperatures.

Example 7

A quantity of polyethylene glycol (96.15 g) having a molecular weight of 200 (PEG-200) was added to a 600 mL beaker and the beaker placed under an overhead stirrer equipped with a 2 inch diameter 3-blade propeller. The stirrer was adjusted to 250 rpm and 57.7 g of polyisobutylene succinnic anhydride copolymer, diethanolamine salt (PIBSA) was added and the system mixed for 30 minutes until the PIBSA dissolved. Next, 96.15 g of the emulsion prepared in Example 1 was added and the system mixed for 20 minutes. The composition had a density of 0.971 g/ml and a Brookfield LVDVII+ viscosity of 32000 mPa·s using a # 4 spindle at 6 rpm. The composition had a thick, paste-like consistency. The composition in terms of percent by weight was as follows:

| | |
|---|---|
| Emulsion from Example 1 | 38.46% |
| PEG-200 | 38.46% |
| PIBSA | 23.08% |

The dissolution rate of this material was measured using the dissolution rate test described above. The results show that the modified emulsion polymer had good dissolution properties which improve with increasing temperature.

| Temperature, ° C. | Dissolution Rate Constant, k (min$^{-1}$) |
|---|---|
| 20 | 0.025 |
| 30 | 0.040 |
| 40 | 0.106 |
| 50 | 0.107 |
| 60 | 0.255 |

This example illustrates that the use of a non-flammable, less hazardous solvent than toluene or acetone can be used and enhanced dissolution properties over broad temperature ranges may still be achieved.

Example 8

In this example, 50 g of PEG-200 was added to a 600 mL beaker and the beaker placed under an overhead stirrer equipped with a 2 inch diameter 3-blade propeller. The stirrer was adjusted to 250 rpm and 12.5 g of an ethoxylated tallow amine (Rhodameen PN-430) and 37.5 g of polyisobutylene succinnic anhydride copolymer, diethanolamine salt were added and mixed for 20 minutes until dissolved. Next, 150 g of the emulsion prepared in Example 1 was then added and the system mixed for 20 minutes. The composition had a density of 1.0078 g/ml and a Brookfield LVDVII+ viscosity of 1120 mPa·s using a # 4 spindle at 30 rpm. The composition in terms of percent by weight was as follows:

| | |
|---|---|
| Emulsion from Example 1 | 60% |
| PEG-200 | 20% |
| Rhodameen PN-430 | 5% |
| PIBSA | 15% |

The dissolution rate of this material was measured using the dissolution rate test described above. The results show that the modified emulsion polymer had good dissolution properties which improve with increasing temperature.

| Temperature, ° C. | Dissolution Rate Constant, k (min$^{-1}$) |
|---|---|
| 20 | 0.007 |
| 30 | 0.016 |
| 40 | 0.057 |
| 50 | 0.072 |
| 60 | 0.276 |

This example illustrates the use of more than one low HLB surfactant to achieve an enhanced dissolution rate over the emulsion alone and allows the use of a lower concentration of solvent and low HLB surfactants to achieve a given dissolution rate at certain temperatures.

Example 9

In this example, 60 g of peg-200, 60 g of tripropylene glycol methyl ether and 6 g of 1-hexanol were added to a 1000 mL beaker and the beaker placed under an overhead stirrer equipped with a 3 inch diameter 3-blade propeller. The stirrer was adjusted to 250 rpm. Next, 30 g of an ethoxylated tallow amine (Rhodameen PN-430) and 90 g of polyisobutylene succinnic anhydride copolymer, diethanolamine salt were added and mixed for 30 minutes until dissolved. Then, 354 g of the emulsion prepared in Example 1 was added and the system mixed for 20 minutes. The composition had a density of 0.9979 g/ml and a Brookfield LVDVII+ viscosity of 3071 mPa·s using a # 4 spindle at 30 rpm. The composition in terms of percent by weight was as follows:

| Emulsion from Example 1 | 59% |
|---|---|
| PEG-200 | 10% |
| Tripropylene glycol methyl ether | 10% |
| 1-hexanol | 1% |
| Rhodameen PN-430 | 5% |
| PIBSA | 15% |

The dissolution rate of this material was measured using the dissolution rate test described above. Results show that the modified emulsion polymer had good dissolution properties which improve with increasing temperature.

| Temperature, ° C. | Dissolution Rate Constant, k (min$^{-1}$) |
|---|---|
| 20 | 0.011 |
| 30 | 0.028 |
| 40 | 0.046 |
| 50 | 0.084 |
| 60 | 0.290 |

This example illustrates the use of more than one low HLB surfactant and more than one solvent to achieve an enhanced dissolution rate over the emulsion alone and allows the use of a lower concentration of solvent and low HLB surfactants to achieve a given dissolution rate at certain temperatures.

Figure 7:
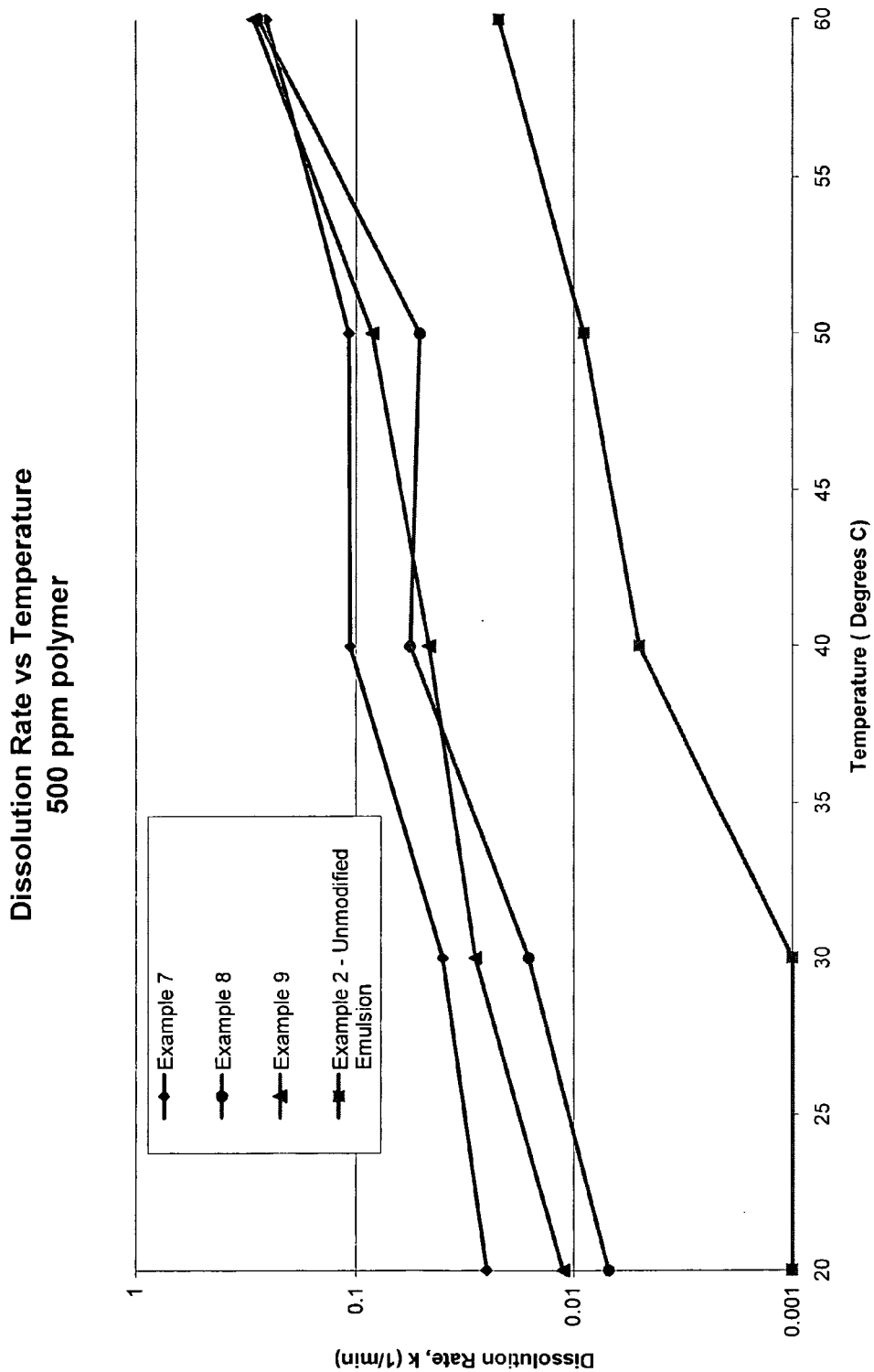
FIG. 7 is a graph of the dissolution rate constant for various drag reducer formulations over a range of temperatures.

FIG. 7 is a plot of dissolution rate vs temperature for Examples 7, 8 and 9. This comparison of the dissolution rates of the various systems illustrates that the use of more than one solvent and or low HLB surfactant can be used to achieve similar dissolution properties. In the case of Example 7, much higher additive concentrations were needed using a single surfactant and solvent to achieve only marginal improvements in dissolution rates. By using multiple surfactants and/or solvents to enable the use of a lower concentration of additives one can also achieve a mixture with a lower viscosity.

Example 10

In this example, 104.15 g of toluene was added to a 600 mL beaker and the beaker placed under an overhead stirrer equipped with a 2 inch diameter 3-blade propeller. The stirrer was adjusted to 250 rpm and 41.675 g of sorbitan sesquioleate was added and the system mixed for 10 minutes until dissolved. Next, 104.175 g of the emulsion prepared in Example 1 was added and mixed for 20 minutes. The composition had a density of 0.939 g/ml and a Brookfield LVDVII+ viscosity of 3700 mPa·s using a # 4 spindle at 12 rpm. The composition in terms of percent by weight was as follows:

| Emulsion from Example 1 | 41.67% |
|---|---|
| Toluene | 41.66% |
| Sorbitan sesquioleate | 16.67% |

The mixture prepared above was injected into the two inch Engineering Loop Re-circulation Test apparatus described in Example 2 in a sufficient amount to yield a concentration of 3 ppm of poly-2-ethylhexylmethacrylate (w/w) based on the weight of the #2 diesel fuel. After injection, the pressure of the test loop quickly began to drop. A pressure drop equal to 10.75% DR was measured in 600 seconds (10 minutes).

Example 11

In this example, 104.15 g of toluene was added to a 600 mL beaker and the beaker placed under an overhead stirrer equipped with a 2 inch diameter 3-blade propeller. The stirrer was adjusted to 250 rpm and 145.85 g of the emulsion prepared in Example 1 was then added and mixed for 20 minutes. The composition had a density of 0.937 g/ml and the Brookfield LVDVII+ viscosity was too high to be measured using this instrument at 12 rpm. The composition in terms of percent by weight is as follows:

| Emulsion from Example 1 | 58.34% |
|---|---|
| Toluene | 41.66% |
| Sorbitan sesquioleate | 0% |

The mixture prepared above was injected into the two inch Engineering Loop Re-circulation Test apparatus as described in Example 2 in a sufficient amount to yield a concentration of 3 ppm of poly-2-ethylhexylmethacrylate (w/w) based on the weight of the #2 diesel fuel. During the 3 hour test no significant drag reduction was measured.

Example 12

In this example, 208.325 g of the emulsion prepared in Example 1 was added to a 600 mL beaker and the beaker placed under an overhead stirrer equipped with a 2 inch diameter 3-blade propeller. The stirrer was adjusted to 250 rpm and 41.675 g of sorbitan sesquioleate was then added and mixed for 20 minutes. The composition had a density of 0.991 g/ml and the Brookfield LVDVII+ viscosity was too high to be measured using this instrument at 12 rpm. The mixture had a smooth, paste-like consistency. The composition in terms of percent by weight was as follows:

| Emulsion from Example 1 | 58.34% |
|---|---|
| Toluene | 0% |
| Sorbitan sesquioleate | 16.67% |

The mixture prepared above was injected into the two inch Engineering Loop Re-circulation Test apparatus as described in Example 2 in a sufficient amount to yield a concentration of 3 ppm of poly-2-ethylhexylmethacrylate (w/w) based on the weight of the #2 diesel fuel. During a 3 hour test, no significant drag reduction was measured.

Figure 8:
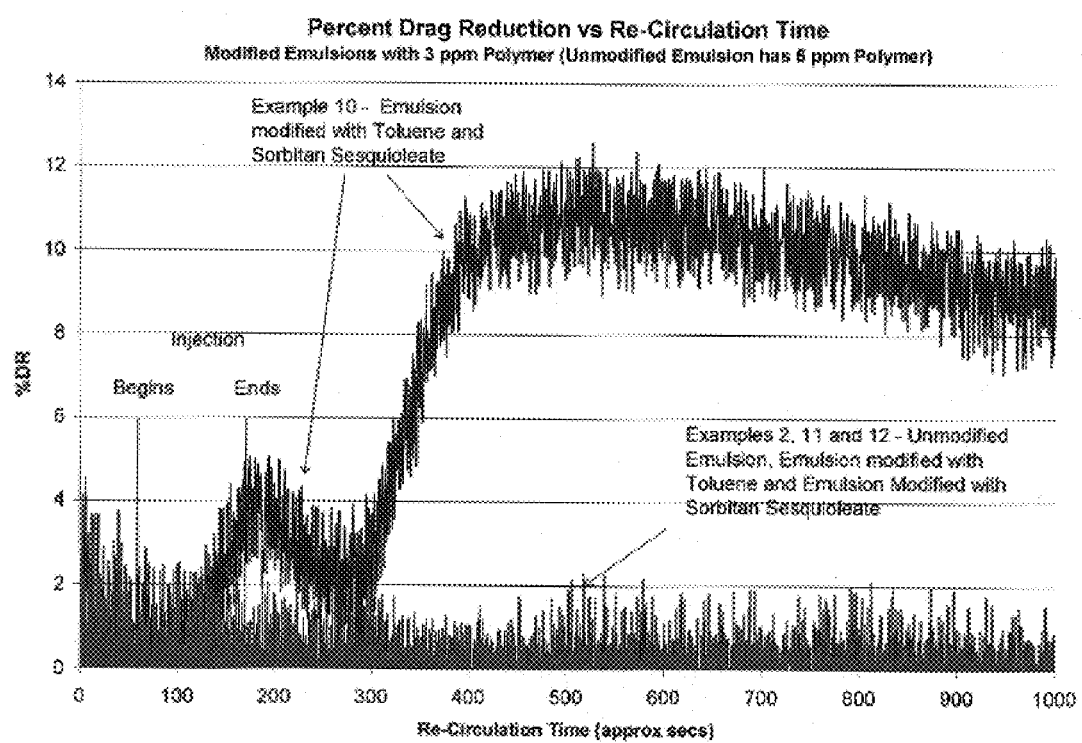
FIG. 8 is a plot of the drag reduction in the Engineering Loop Re-circulation Test apparatus using various drag reducing materials.

FIG. 8 is a plot of the drag reduction in the 2-inch Engineering Loop Re-circulation Test for Examples 2, 10, 11 and 12. In this plot of % Drag reduction vs circulation time, the injection into the recirculating fluid occurred at 100 seconds. During the next 120 seconds the modified emulsions were injected at a higher concentration (21.5 ppm polymer for the modified and 35.8 ppm for the unmodified emulsion) and at a rate proportional to the flow of one pass of the diesel fuel through the loop calculated as:

Initial concentration (ppm)=injection rate/(injection rate+loop rate)

This equilibrated with the balance of the diesel fuel in the storage tank so that within about 300 seconds total elapsed time the polymer was at the equilibrium concentration described (i.e. 3 ppm polymer for the modified emulsions and 5 ppm for the unmodified emulsion). The equilibrium concentration was calculated as:

Equilibrium concentration (ppm)=mass polymer/ mass diesel

This plot illustrates the rapid rate of drag reduction of an emulsion modified with both toluene and sorbitan sesquioleate (Example 10) compared to the emulsion modified with either toluene alone (Example 11) or sorbitan sesquioleate alone (example 12) at an equilibrium polymer concentration of 3 ppm. Additionally the drag reduction performance of an unmodified emulsion at an equilibrium polymer concentration of 5 ppm is illustrated. The plot shows that the emulsion modified with both toluene and sorbitan sesquioleate exhibited rapid development of drag reduction properties in this test loop while the unmodified and the materials modified with either toluene or sorbitan sesquioleate singly did not develop any measurable drag reduction.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A latex drag reducer comprising:
   (a) a continuous phase; and
   (b) a plurality of particles of a high molecular weight polymer dispersed in said continuous phase, wherein said polymer particles have been formed via emulsion polymerization,
   said latex drag reducer having a hydrocarbon dissolution rate constant of at least about 0.004 min$^{-1}$ in kerosene at 20° C.,
   said continuous phase comprising at least one high HLB surfactant and at least one low HLB surfactant.

2. The latex drag reducer according to claim 1,
   said at least one high HLB surfactant having an HLB number of at least about 8,
   said at least one low HLB surfactant having an HLB number of less than about 6.

3. The latex drag reducer according to claim 1,
   said at least one high HLB surfactant comprising a high HLB surfactant selected from the group consisting of high HLB alkyl sulfates, alkyl ether sulfates, dialkyl sulfosuccinates, alkyl phosphates, alkyl aryl sulfonates, sarcosinates, sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates,
   said at least one low HLB surfactant comprising one or more low HLB surfactants selected from the group consisting of low HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, polyethylene glycols, linear alcohol ethoxylates, alkyl phenol ethoxylates and oil soluble polymeric enmlsifiers.

4. A latex drag reducer comprising:
   (a) an aqueous continuous phase comprising at least one high HLB surfactant, at least one low HLB surfactant, and at least one solvent; and
   (b) a plurality of particles of a high molecular weight polymer dispersed in said continuous phase, wherein said polymer particles have been formed via emulsion polymerization.

5. The latex drag reducer according to claim 4,
   said high molecular weight polymer being formed from the polymerization of one or more monomers selected from the group consisting of:

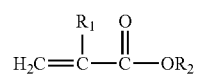
(A)

wherein $R_1$ is H or a C1-C10 alkyl radical, and $R_2$ is H or a C1-C30 alkyl radical;

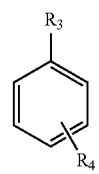
(B)

wherein $R_3$ is CH=CH$_2$ or CH$_3$—C=CH$_2$ and $R_4$ is H or a C1-C30 alkyl radical;

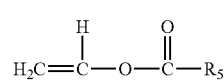
(C)

wherein $R_5$ is H or a C1-C30 alkyl radical;

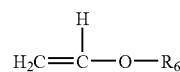
(D)

wherein $R_6$ is H or a C1-C30 alkyl radical;

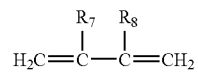
(E)

wherein $R_7$ is H or a C1-C18 alkyl radical, and $R_8$ is H or a C1-C18 alkyl radical;

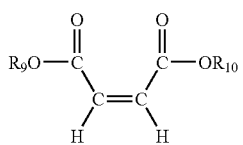

wherein $R_9$ and $R_{10}$ are independently H, C1-C30 alkyl, aryl, cycloalkyl, or heterocyclic radicals;

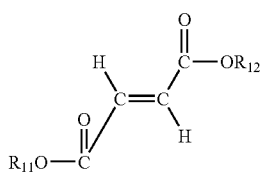

wherein $R_{11}$ and $R_{12}$ are independently H, C1-C30 alkyl, aryl, cycloalkyl, or heterocyclic radicals;

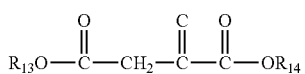

wherein $R_{13}$ and $R_{14}$ are independently H, C1-C30 alkyl, aryl, cycloalkyl, or heterocyclic radicals; and

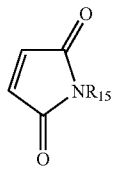

wherein $R_{15}$ is H, a C1-C30 alkyl, aryl, cycloalkyl, or heterocyclic radical.

6. The latex drag reducer according to claim 5,
said monomer being 2-ethylhexyl methacrylate.

7. The latex drag reducer according to claim 4,
said at least one high HLB surfaetant having an HLB number of at least about 8,
said at least one low HLB surfactant having an HLB number of less than about 6.

8. The latex drag reducer according to claim 4,
said at least one high HLB surfactant comprising a high HLB surfactant selected from the group consisting of high HLB alkyl sulfates, alkyl ether sulfates, dialkyl sulfosuccinates, alkyl phosphates, alkyl aryl sulfonates, sarcosinates, sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates,
said at least one low HLB surfactant comprising one or more low HLB surfactants selected from the group consisting of low HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, polyethylene glycols, linear alcohol ethoxylates, alkyl phenol ethoxylates and oil soluble polymeric emulsifiers,
said solvent being selected from the group consisting of aromatic solvents, partially and fully hydrogenated solvents, glycols, glycol ethers, esters, nitrogen containing solvents, aliphatic and aromatic alcohols, ketones, sulfur containing solvents, tetrahydrofuran, alkyl halides, and combinations thereof.

9. The latex drag reducer according to claim 4,
said continuous phase further comprising a sufficient quantity of buffer so that said continuous phase has a pH of about 4-10.

10. The latex drag reducer according to claim 4,
said polymer having a weight average molecular weight of at least about $1 \times 10^6$ g/mol.

11. The latex drag reducer according to claim 4,
said drag reducer having a hydrocarbon dissolution rate constant of at least about 0.004 min$^{-1}$ in kerosene at 20° C.

12. A method of making a drag reducer, said method comprising the steps of:
(a) combining water, at least one high HLB surfactant, and at least one monomer to thereby form a reaction mixture;
(b) subjecting said reaction mixture to emulsion polymerizing at a polymerization temperature of less than about 60° C. to thereby provide an initial latex comprising particles of a drag reducing polymer having a weight average molecular weight of at least about $5 \times 10^6$ g/mol, wherein the mean particle size of said particles is less than about 1 micron; and
(c) introducing at least one low HLB surfactant and at least one solvent into said initial latex in an amount sufficient enhance the hydrocarbon dissolution rate constant of said initial latex without substantially breaking or inverting said initial latex.

13. The method according to claim 12,
said at least one low HLB surfactant comprising one or more low HLB surfactants selected from the group consisting of low HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, polyethylene glycols, linear alcohol ethoxylates, alkyl phenol ethoxylates and oil soluble polymeric emulsifiers.

14. The method according to claim 12,
said at least one solvent being selected from the group consisting of aromatic solvents, partially and fully hydrogenated solvents, glycols, glycol ethers, esters, nitrogen containing solvents, aliphatic and aromatic alcohols, ketones, sulfur containing solvents, tetrahydrofuran, alkyl halides, and combinations thereof.

15. The method according to claim 12,
said at least one monomer comprising 2-ethyihexyl methacrylate.

16. The method according to claim 12,
step (c) causing at least about a 10% increase in the hydrocarbon dissolution rate constant of the latex, wherein said hydrocarbon dissolution rate constant is measured in kerosene at 20° C.

17. The method according to claim 12,
after introduction of said at least one low HLB surfactant and said solvent, said latex having a hydrocarbon dissolution rate constant of at least about 0.004 $\text{min}^{-1}$ in kerosene at 20° C.

18. The method according to claim 12,
said at least one high HLB surfactant having an HLB number of at least about 8,
said at least one low HLB surfactant having an HLB number of less than about 6.

19. A method of reducing drag forces associated with turbulent flow of a fluid through a conduit, said method comprising:
introducing a drag reducer into said fluid,
said drag reducer being a colloidal dispersion comprising particles of a high molecular weight polymer dispersed in a continuous phase,
said polymer particles having been formed via emulsion polymerization,
said drag reducer having a hydrocarbon dissolution rate constant of at least about 0.004 $\text{min}^{-1}$ in kerosene at 20° C.,
said continuous phase comprising at least one high HLB surfactant, at least one low HLB surfactant, and at least one solvent.

20. The latex drag reducer according to claim 19,
said at least one high HLB surfactant having an HLB number of at least about 8,
said at least one low HLB surfactant having an HLB number of less than about 6.

21. The latex drag reducer according to claim 19,
said at least one high HLB surfactant having an HLB number of at least about 10,
said at least one low HLB surfactant having an HLB number of less than about 5.

22. The latex drag reducer according to claim 19,
said at least one high HLB surfactant comprising a high HLB surfactant selected from the group consisting of high HLB alkyl sulfates, alkyl ether sulfates, dialkyl sulfosuccinates, alkyl phosphates, alkyl aryl sulfonates, sarcosinates, sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates,
said at least one low HLB surfactant comprising one or more low HLB surfactants selected from the group consisting of low HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, polyethylene glycols, linear alcohol ethoxylates, alkyl phenol ethoxylates and oil soluble polymeric emulsifiers,
said at least one solvent being selected from the group consisting of aromatic solvents, partially and fully hydrogenated solvents, glycols, glycol ethers, esters, nitrogen containing solvents, aliphatic and aromatic alcohols, ketones, sulfur containing solvents, tetrahydrofuran, alkyl halides, and combinations thereof.

* * * * *